United States Patent [19]
Chapman

[11] 4,212,268
[45] Jul. 15, 1980

[54] AQUACULTURE HABITAT

[75] Inventor: Paul W. Chapman, Derry, N.H.

[73] Assignee: Sanders Associates, Inc., Nashua, N.H.

[21] Appl. No.: 918,885

[22] Filed: Jun. 26, 1978

[51] Int. Cl.³ .............................................. A01K 61/00
[52] U.S. Cl. ............................................ 119/2; 119/3
[58] Field of Search ..................................... 119/2, 3, 4

[56] References Cited
U.S. PATENT DOCUMENTS

| | | | |
|---|---|---|---|
| 2,989,945 | 6/1961 | Ford | 119/2 X |
| 3,387,587 | 6/1968 | Kelley et al. | 119/2 |
| 3,858,554 | 1/1975 | Beaupoil et al. | 119/2 |
| 3,889,639 | 6/1975 | Day et al. | 119/2 |
| 3,929,100 | 12/1975 | Thomas et al. | 119/2 |
| 3,985,101 | 10/1976 | Thompson | 119/2 |
| 4,007,709 | 2/1977 | Wishner | 119/2 |

Primary Examiner—Hugh R. Chamblee
Attorney, Agent, or Firm—Louis Etlinger; Richard I. Seligman

[57] ABSTRACT

An aquaculture habitat is described for the rearing of post larval crustacia in which a cellular honeycomb structure, preferably of opposed cones, provides compartments for the animals and serves as the domicile core. Individual animals are inserted into the core compartments and the core is sealed with a screen or a mesh on either side of the core. The screen or mesh is of a size such that water and food may pass through but which restrains the animals. Cores with screens in place are vertically oriented and horizontally stacked on a false bottom within a tank of water. The tank is provided with food distribution means adjacent the false bottom, and air lift circulation means beneath the food distribution means which, due to the upward rise of the expanding air bubbles, moves the food and freshly filtered and aerated water to the vicinity of the habitats. Animal feeding is accomplished by food penetration through the screen or by the animal plucking the food from the adjacent water by reaching through the screen. Moreover, habitat cleaning is accomplished by the animal in pushing out unwanted debris from the compartment through the screen.

8 Claims, 4 Drawing Figures

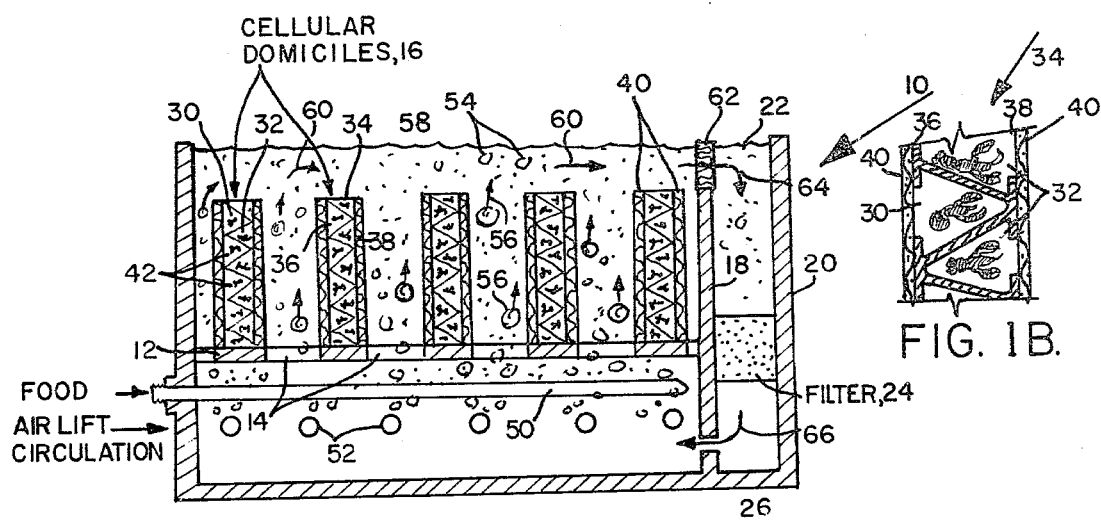
FIG. 1A
FIG. 1B.
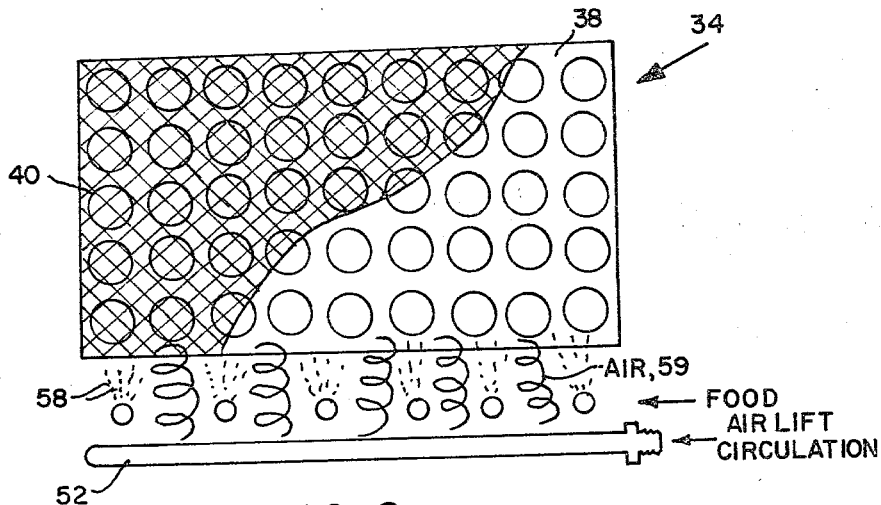
FIG. 2.
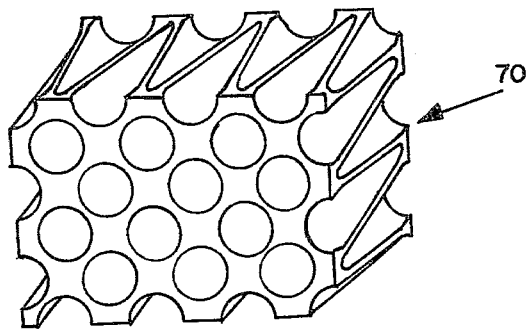
FIG. 3.

AQUACULTURE HABITAT

FIELD OF INVENTION

This invention relates to aquaculture habitats and more particularly to a habitat for raising small crustaceans whose carniverous nature necessitates physical separation of the animals, or whose territorial instincts would cause an open system to be uneconomically large.

BACKGROUND OF THE INVENTION

As is well known, most crustaceans are carniverous from the larval stage until full maturity and in general, must be separated during growth. In the past, separation has been accomplished by placing one animal per petri dish or by keeping the animals in a constant turbulent water flow. It will be appreciated that the density achievable through the utilization of petri dishes or other types of small containers is exceedingly low, and the maintenance of proper water quality is exceedingly difficult, making this system uneconomical. With respect to the turbulation method of separation of the animals, animals are damaged, do not feed well, and consequently, either do not grow rapidly enough or die due to trauma induced by the constant agitation or turbulation.

The problem of raising crustaceans and more particularly, post larval lobsters from birth through the early months is solved in the subject invention by providing a rectangular honeycomb type core habitat or domicile in which the honeycomb or core cavities provide compartments for the animals. In a preferred embodiment, the honeycomb core is composed of opposed cones facing outwardly such that the open end of the cone is adjacent a face of the rectangular core material.

Animals are inserted one per conical compartment formed by the core structure and a screen or mesh is then placed over each of the two opposing faces of the core to maintain the animals within each of the conical compartments. The core and screen combination is then removeably mounted above a false bottom within a tank of water. In one embodiment habitats made in this manner are oriented on end in rows, with space left between the habitats. This provides that the open ends of the compartments lie in vertical planes.

Immediately beneath the habitats formed in this fashion are provided delivery tubes through which food may be injected immediately beneath the habitats. Alternatively, doped food rods may be used. This food is carried upward by air lift circulation provided by aerator tubes, such that as the air bubbles rise, the food, normally live artemia or brine shrimp, is carried upwardly past the habitats, where they either swim through the mesh or are captured by the animals which reach through the mesh. This latter method of feeding is an unexpected finding, in that it was discovered that even the smallest larval lobsters will reach through the mesh to obtain food.

A trap in the form of a screen is provided at the top of the tank to maintain the live food or brine shrimp within the portion of the tank occupied by the habitats, whereas overflow water is filtered and reintroduced to the air lift circulation region so as to provide circulating high quality water and fresh food in the vicinity of the habitats.

By holding animals in the aforementioned double sided cellular core, the density of animals that can be raised successfully increased from 8.5 animals per cubic foot to a density of more than 600 animals per cubic foot.

It was originally thought that a configuration of this type might be unacceptable because it was questionable whether a mesh size could be chosen which would allow the artemia to swim in but restrain the post larval crustacia. It was found that an appropriate mesh could be selected and that food will penetrate the mesh and, more importantly, that after a few days, even the smallest of the animals will learn to pluck the food from the water adjacent the screen by reaching through the screen. Thus, it is an unexpected result that food can successfully be transferred into a semi-closed habitat without the necessity of providing food directly into the habitat itself.

Another unexpected result when utilizing the type of habitats described, is the fact that the animals clean the habitat by pushing unwanted debris out through the screen. One plausible explanation for the self-cleaning aspect of the subject habitat is the slanting of the floor portion downwardly along with the animals' natural desire for a clean habitat. Thus, sediment and other materials which would be deleterious to the animals' health, are removed from the habitat by the animal itself and this phenomenon, although completely unexpected, results in a much higher yield. Another aid to cleaning is that turbulent water within the compartment provides cleaning action. As will be appreciated, gaffkemia and other diseases are common and in general, are in part aggravated by the contamination of the habitat. However, with the slanted floor provided by the conical habitat, cleaning occurs either through action by the animals or by the slight turbulence produced by the air bubbling in which the sediment gradually works its way towards the base of the cone and out through the screen.

Prior to testing, there was also some uncertainty as to the ability of the animals to survive in a compartment in which the floor was permanently slanted, that is to say, not level. After extensive testing, it is a finding of this invention that these animals can, in fact, survive and thrive with the configuration shown and that the non-level floor appears not to be a negative factor in animal health. While the subject invention has been described in terms of a conical cored honeycomb, this invention is not limited to the particular honeycomb structure.

By the utilization of sealing face plates of glass, plastic, etc., it is possible to retain the animals in the water bath at all times during handling operations. It will be appreciated that each screen can be provided with a removeable cover plate which may be slid over the screen to maintain the animals in a water bath prior to removal of the habitat from the tank. The habitat can then be laid on one side, and the uppermost cover plate can be removed to permit access to all the animals in compartments facing upwards. The core can then be reversed for access to animals on the opposite side.

It will thus be appreciated that with the subject system for relatively delicate small animals, the number of handling operations is minimized.

In summary, the subject habitats provide early separation of the animals, live feedings through a selective screen, and high density of 288 animals per square foot of cellular core material, permitting a density in excess of 600 animals per cubic foot during the first few months of life. Moreover, water quality in each cell is maintained by turbulent mixing of water generated by the air flow and there is ready access to any core segment in the array without operational interference to other sections of the domicile. Thus, there is complete random access to any animal without disturbance to others.

It is therefore an object of this invention to provide a cellular domicile for the high density raising of aquatic animals;

It is another object of this invention to provide a habitat and feeding system in which freshly filtered and aerated water containing live food is made to flow by the face of habitats which are sealed by a selective screen;

It is a still further object of this invention to provide an air lift circulation feeding system for habitats;

It is a still further object of this invention to provide a method for increasing the density of animals and the rearing of animals from birth to a predetermined age;

It is another object of this invention to provide a habitat for the rearing of small animals in which apparatus for introducing food directly into the individual habitats is not needed;

It is another object of this invention to provide a cellular habitat in which the floor portions thereof need not be maintained in a horizontal plane; and It is a still further object of this invention to provide a habitat comprising a core of cellular material with screens on opposing faces and having an opposing cone structure so as to increase the capacity of the area allocated for raising animals.

These and other objects of the invention will be more fully appreciated in view of the following specification taken in conjunction with the appended drawings.

BRIEF DESCRIPTION OF THE DRAWINGS

FIG. 1A is a cross sectional and diagrammatic view of the subject habitats located in an air lift circulation water-filled tank in which food is injected between the air lift circulation means and the habitats;

FIG. 1B is a cross sectional view of one of the domiciles of FIG. 1A;

FIG. 2 is a plan and cutaway view of one of the habitats illustrating the screen and cellular structure as well as a schematic illustration of the air lift circulation and food introduction; and FIG. 3 is an isometric view of one type cellular structure useable as a core member for the habitats of FIGS. 1 and 2.

DETAILED DESCRIPTION

Referring now to FIGS. 1 and 2, a tank generally designated by reference character 10 includes a false bottom 12 having apertures 14 and on which are removably mounted cellular domiciles or habitats 16. In a preferred embodiment, the habitats are in the form of slim rectangular cellular solids, and are stood on end and separated in rows within the tank so that the faces of the habitats extend vertically. On the right hand side of the tank is an internal plate 18 which with sidewall 20 of tank 10 forms a return channel 22 for water within the tank.

A suitable water purification filter 24 is located within the return channel. Downstream of filter 24 filtered water from this filter exits into the tank via orifice 26.

Each of the cellular domiciles, in a preferred embodiment, is characterized by opposed and interleaved conical core compartments 30 and 32 respectively which are formed in a core member 34. Core member 34 has two opposing faces 36 and 38 at which are located screens 40 which are of a mesh size to permit the influx of food while at the same time restraining animals 42 within the core structure. In one embodiment, for each core, the openings of the compartments at one face lie in a vertical plane when the habitats are mounted in the tank. In short, these openings "look out" in a horizontal direction, and the compartments are substantially horizontal. However, the compartments need not be horizontal but can be tilted.

Food for the animals in the habitats is introduced, in a preferred embodiment, through a perforated feeding tube 50 which is located beneath the false bottom and above air lift circulation means 52 in the form of perforated aerator tubes.

In operation, air bubbles 54 generated by pressurizing the aerator tubes rise as indicated by arrows 56. Food indicated by particles 58, is lifted from the vicinity of the food distribution means and flows adjacent to the outer surfaces of screens 40.

Because of the air lift circulation, the water flow as illustrated by arrows 60 is such that the water circulates upwardly and to the right, and then through a trap 62 which prevents the food from entering return channel 22. This trap may preferably be in the form of a fine screen as illustrated. The return water as illustrated by arrow 64 is then filtered by filter 24 and proceeds to the bottom of the tank as illustrated by arrow 66.

It will be appreciated that the cellular domiciles may take the form of a conventional honeycomb, as opposed to having the aforementioned opposing cone structure, although the density of the habitats will be halved.

When it is desirable to remove or inspect the animals, a fitted water impervious shield (not shown) may be slipped over the habitat adjacent to each screen. The cellular domiciles may then be removed, laid flat on a table, and the top shield removed for removal of selected animals as desired.

It will be appreciated that the cellular domiciles may be mounted within tank 10 in any desired manner so long as air bubbles are free to pass between the domiciles carrying the food with them. Likewise, the food distribution means may be any convenient type of food distribution means in which the food is removed and distributed by the bubble action immediately adjacent. Of course, air stones may be substituted for the aerators illustrated and, in fact, any air bubbling means may be utilized beneath the food distribution means. In one operative embodiment, the screen mesh for post larval lobsters had a mesh size of ⅛ inch.

It will be appreciated that what has been provided is apparatus for the raising of small aquatic animals comprising a tank having a floor and sides, the tops of which form a lip for the tank, and a plurality of habitats each having a cellular structure in which the cells function as animal raising compartments, with each compartment having an outwardly facing opening. Mesh means are provided for covering the openings of the compartments and the habitats are vertically mounted in spaced adjacency above the floor of the tank. Means are provided beneath the habitats for introducing food into the tank and aerator means are provided beneath the food providing means to generate air bubbles when the tank is filled with water. The air bubbles lift the food and conditioned water into the vicinity of the habitats such that the air bubbles provide both air and food adjacent the openings of the compartments in the habitats.

What has therefore been provided is an exceptionally dense method and apparatus for the rearing of crustaceans and other small animals from birth to some predetermined size. In the case of post larval lobsters with the size habitats herein described, it is possible to obtain a density of 600 animals per cubic foot and raise these animals to an age of several months where they may then be transferred to other suitable habitats. The cellular core structure provides separation of the animals so as to protect them one from the other, with the air lift circulation and screen structure restraining the animals in their compartments and providing a mechanism by which food can be transferred from the water adjacent the habitats to the interior of the habitats without additional means inserted into each cell. This provides for exceptional density in the rearing of the animals.

Further, as mentioned before, it has been found that either one of two mechanisms apply in the transfer of the food from the water adjacent the cell to the interior of the cell. In the case of brine shrimp, the shrimp simply swim into the cell or, alternatively, the resident animal can actually reach through the screen structure and capture the food as it passes. In either case, food is introduced expeditiously into each cell of the cellular habitat structure.

As mentioned herein, cell structures having slanted floors assist the animals in pushing out unwanted debris through the screens, thereby affording an exceptionally clean system which minimizes disease and increases yield. Additional assistance to the cleaning of the individual cells is the turbulence within the chamber created by the air-lift pumping action.

The air lift circulation therefore provides the function of aerating the water for the animals, delivering food to the vicinity of each animal compartment, providing a cleaning action for the cells themselves, and circulating water through the filtration and aeration system.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. Apparatus for the raising of aquatic animals comprising:

a tank adapted to hold water, said tank having a floor and sides, the tops of said sides forming a lip for said tank;

a plurality of habitats, each comprising a cellular core structure having cells which function as animal rearing compartments, each compartment having an outwardly facing opening, and mesh means for covering the openings of said compartments;

means for mounting said habitats in spaced adjacency above the floor of said tank;

means beneath said habitats for providing food to said tank; and aerator means beneath said food providing means for generating air bubbles, whereby when said tank is filled with water and air bubbles are produced, both air and food are provided adjacent said habitats by air lift circulation.

2. The apparatus of claim 1 wherein said cells are in the form of opposed cones having the apex of one cone adjacent the base of another.

3. The apparatus of claim 1 wherein said compartment openings lie in a vertical plane.

4. The apparatus of claim 1 wherein said tank includes an interior wall spaced from one side so as to form a return channel, said interior wall having an aperture at the base thereof, said wall extending upwardly and terminating below the lip of said tank, said tank also including means at the top of said interior wall to trap particles of a predetermined size while permitting the passage of water therethrough.

5. The apparatus of claim 4 and further including water filter means within said channel.

6. A method of providing food, air, and water to animal rearing compartments comprising the steps of:

providing in a tank of water compartments having openings and mesh means covering said openings;

positioning food distribution means beneath said compartments in said tank; and providing air lift circulation means beneath said food distribution means, such that bubbles formed by said air lift circulation means carry food from the food distribution means into the vicinity of said mesh means.

7. The method of claim 6 wherein said openings lie in a vertical plane and wherein the air lift circulation of food, air and water flows by said openings.

8. The method of claim 6 wherein said compartments look out in a horizontal direction.

* * * * *